(12) United States Patent
Webster

(10) Patent No.: US 7,453,358 B2
(45) Date of Patent: Nov. 18, 2008

(54) SHOPPING CART CONVEYOR WITH GATED ACCESS

(75) Inventor: Mark R. Webster, Hubertus, WI (US)

(73) Assignee: Pflow Industries, Inc., Milwaukee, WI (US)

( * ) Notice: Subject to any disclaimer, the term of this patent is extended or adjusted under 35 U.S.C. 154(b) by 64 days.

(21) Appl. No.: 11/356,608

(22) Filed: Feb. 17, 2006

(65) Prior Publication Data
US 2007/0205859 A1    Sep. 6, 2007

(51) Int. Cl.
    *G08B 13/14*    (2006.01)
(52) U.S. Cl. .................... 340/568.5; 340/5.7; 340/551; 104/172.3; 186/58; 194/905
(58) Field of Classification Search ................ 340/5.7, 340/568.5, 551; 104/172.3, 96, 162, 172.1; 186/58; 134/45, 123, 151; 194/212, 905; 209/577, 939
    See application file for complete search history.

(56) References Cited

U.S. PATENT DOCUMENTS

| | | | |
|---|---|---|---|
| 2,109,210 A | 2/1938 | Dunlop | |
| 2,802,427 A | 8/1957 | Costa | |
| 2,965,049 A | 12/1960 | Royer | |
| 3,305,064 A | 2/1967 | Mullis et al. | |
| 3,318,432 A | 5/1967 | Mullis et al. | |
| 3,395,784 A | 8/1968 | Kanarek | |
| 3,446,315 A | 5/1969 | Close | |
| 3,580,376 A | 5/1971 | Loshbough | |
| 3,655,013 A | 4/1972 | Weller | |
| 3,656,636 A | 4/1972 | Konstantin | |
| 3,832,953 A * | 9/1974 | Aaron .................... | 104/162 |
| 3,837,289 A * | 9/1974 | Marshman et al. ....... | 104/172.3 |
| 3,861,514 A | 1/1975 | Ling | |
| 3,947,832 A | 3/1976 | Rosgen et al. | |
| 4,206,708 A | 6/1980 | Behle | |
| 4,235,327 A | 11/1980 | Heusler et al. | |
| 4,326,622 A | 4/1982 | Ellzey | |
| 4,424,893 A * | 1/1984 | Gillet ..................... | 194/212 |
| 4,438,830 A | 3/1984 | Born | |

(Continued)

FOREIGN PATENT DOCUMENTS

CH    403224    11/1965

(Continued)

*Primary Examiner*—Anh V La
(74) *Attorney, Agent, or Firm*—Michael Best & Friedrich LLC

(57) ABSTRACT

A shopping cart conveyor that inhibits the loading of a non-compliant shopping cart onto the conveyor. In one aspect, the invention provides a conveyor comprising a track operable to guide the shopping cart between a first location and a second location, a gate assembly including a door movable between a closed position inhibiting entry to the track and an open position allowing entry to the track, a lock for securing the door in the closed position, and a sensor (e.g., an ultrasonic sensor, an optical sensor, a radar sensor, an infrared sensor, an RFID reader, a magnetic sensor, and a mechanical sensor) positioned to detect the presence of a shopping cart. In another aspect, the conveyor is configured to move the gate from the closed position to the open position when the sensor detects the presence of a shopping cart. Preferably this is done using a drive mechanism coupled to the gate.

14 Claims, 4 Drawing Sheets

U.S. PATENT DOCUMENTS

| | | |
|---|---|---|
| 4,518,072 A | 5/1985 | Muellner et al. |
| 4,681,207 A | 7/1987 | Goto et al. |
| 5,476,156 A | 12/1995 | Gerber |
| 5,529,163 A | 6/1996 | Decker et al. |
| 5,572,930 A | 11/1996 | Hein |
| 5,785,165 A | 7/1998 | Stahlhut et al. |
| 5,923,005 A | 7/1999 | Blondiau et al. |
| 5,996,767 A | 12/1999 | Misawa |
| 6,138,815 A | 10/2000 | Reiners et al. |
| 6,334,522 B2 | 1/2002 | Haruta et al. |
| 6,490,979 B1 | 12/2002 | Pfleger et al. |
| 6,644,210 B1 | 11/2003 | Pfleger et al. |
| 2006/0011220 A1* | 1/2006 | Mueller ............ 134/45 |
| 2006/0107486 A1* | 5/2006 | Andre ............ 15/302 |

FOREIGN PATENT DOCUMENTS

| | | |
|---|---|---|
| DE | 1249765 | 9/1967 |
| DE | 2456791 | 8/1976 |
| DE | 2916818 | 11/1980 |
| EP | 0012149 | 4/1979 |

* cited by examiner

SHOPPING CART CONVEYOR WITH GATED ACCESS

BACKGROUND

The present invention relates to conveyor systems, and more specifically to conveyer systems for shopping carts.

Currently, many large department stores occupy single floor buildings that include many different product departments and thus have a footprint that covers tens of thousands of square feet. In these large department stores, shoppers typically use shopping carts to carry selected merchandise throughout the store while the shopper continues to select merchandise from the various departments within the store. Since a shopper may be selecting a large number of items having substantial weight, shopping carts are essential in the current department store environment.

Large department stores are commonly located in suburban areas where enough land is available to build a single-story store large enough to-include all of the merchandise to be offered by the retailer. Some large department store chains have been unable to open stores in large, populated urban areas due to the unavailability of large blocks of single-floor retail space. However, in these same urban areas there are often a number of multi-floor vacant buildings that would be large enough to accommodate the floor space required by the department store. Department stores are unable to utilize these multi-floor buildings due to the inability of the department store to transport shopping carts between the various floors of a multi-level store. Although elevators can move shopping carts between he various floors of a multi-floor store, elevators are unable to handle the large number of consumers typically found in one of the large chains of department stores.

In order to address this problem, shopping cart conveyors have been designed to move shopping carts on an inclined conveyor along side of an escalator. One such shopping cart conveyor is disclosed in U.S. Pat. No. 6,490,979, assign to Pflow Industries of Milwaukee, Wis., which is incorporated herein in its entirety. In the Pflow patent, the shopping cart conveyor moves specially-equipped shopping carts between floor of a building.

SUMMARY

J Shopping cart conveyors typically are designed to accommodate only shopping carts of a certain design. These conveyors usually will not function properly if other shopping carts are used. Accordingly, it would be beneficial if the shopping cart conveyors were designed so that other shopping carts were inhibited from being loaded onto the conveyor.

The present invention provides such a shopping cart conveyor that inhibits the loading of a non-compliant shopping cart onto the conveyor. In one aspect, the invention provides a conveyor comprising a track operable to guide the shopping cart between a first location and a second location, a gate assembly including a door movable between a closed position inhibiting entry to the track and an open position allowing entry to the track, a lock for securing the door in the closed position, and a sensor (e.g., an ultrasonic sensor, an optical sensor, a radar sensor, an infrared sensor, an RFID reader, a magnetic sensor, and a mechanical sensor) positioned to detect the presence of a shopping cart. In one embodiment, the shopping cart includes an engagement bracket for engagement with the track, and the sensor is configured to detect the engagement bracket. Preferably, the conveyor further includes a controller coupled to the sensor and to the lock, wherein the controller is configured to unlock the lock when the sensor detects the presence of a shopping cart.

In another aspect, the conveyor is configured to move the gate from the closed position to the open position when the sensor detects the presence of a shopping cart. Preferably this is done using a drive mechanism coupled to the gate. If desired, the movable door can be provided with the above-described lock to secure the gate when it is in the closed position. Alternatively, the drive mechanism can be of a design that substantially prevents movement of the gate when the drive mechanism is not actuated.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
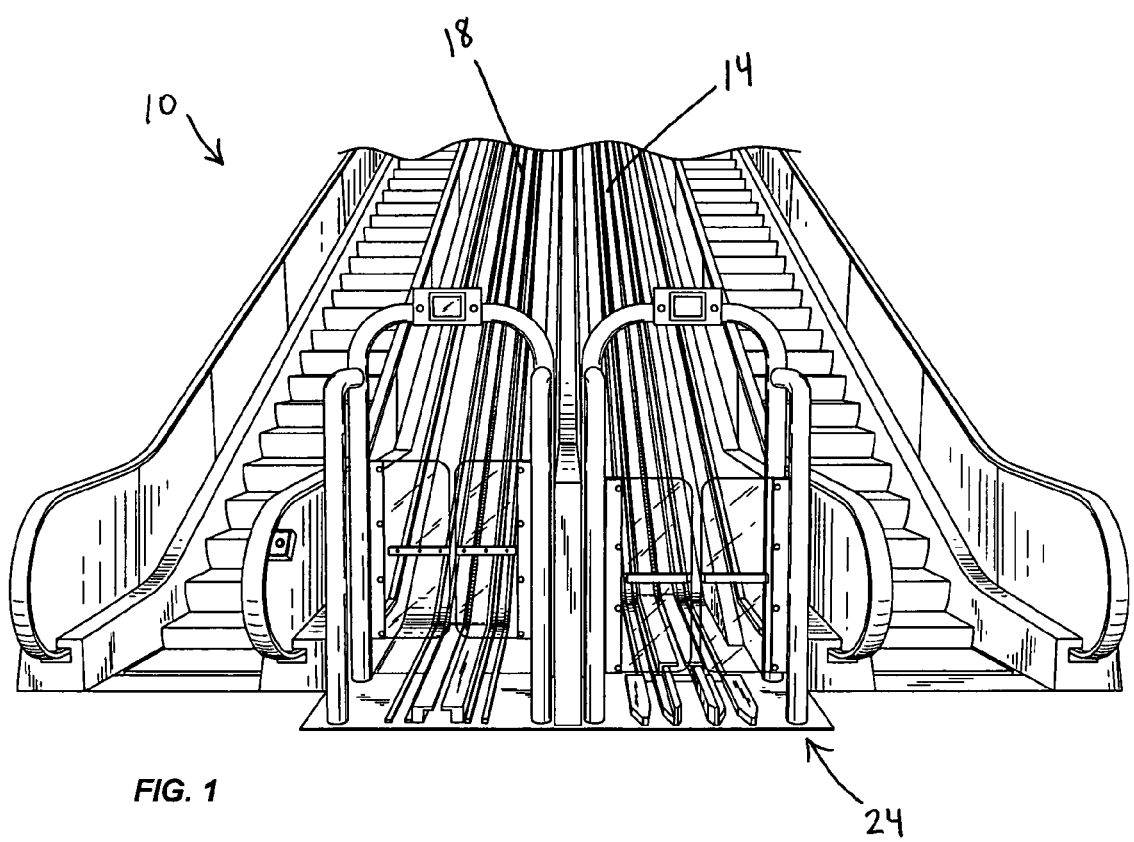
FIG. 1 is a perspective view of a shopping cart conveyor system.

FIG. 1 illustrates a conveyor 10 for moving shopping carts between various locations. In the illustrated embodiment, the conveyor 10 is inclined to move the shopping carts between floors or levels of a department store or the like. The illustrated conveyor 10 includes a first track 14 for moving the shopping cart 14 between a lower level and an upper level, and a second track 18 for moving the shopping cart 12 from the upper level to the lower level. The conveyor 10 may include multiple motors, gears, pulleys, engaging members, and the like. Such components and their respective functions are described in detail in U.S. Pat. No. 6,490,979. In some embodiments, the conveyor 10 is provided with a gate assembly 24 at entry and exit points of both the first track 14 and the second track 18.

Figure 2:
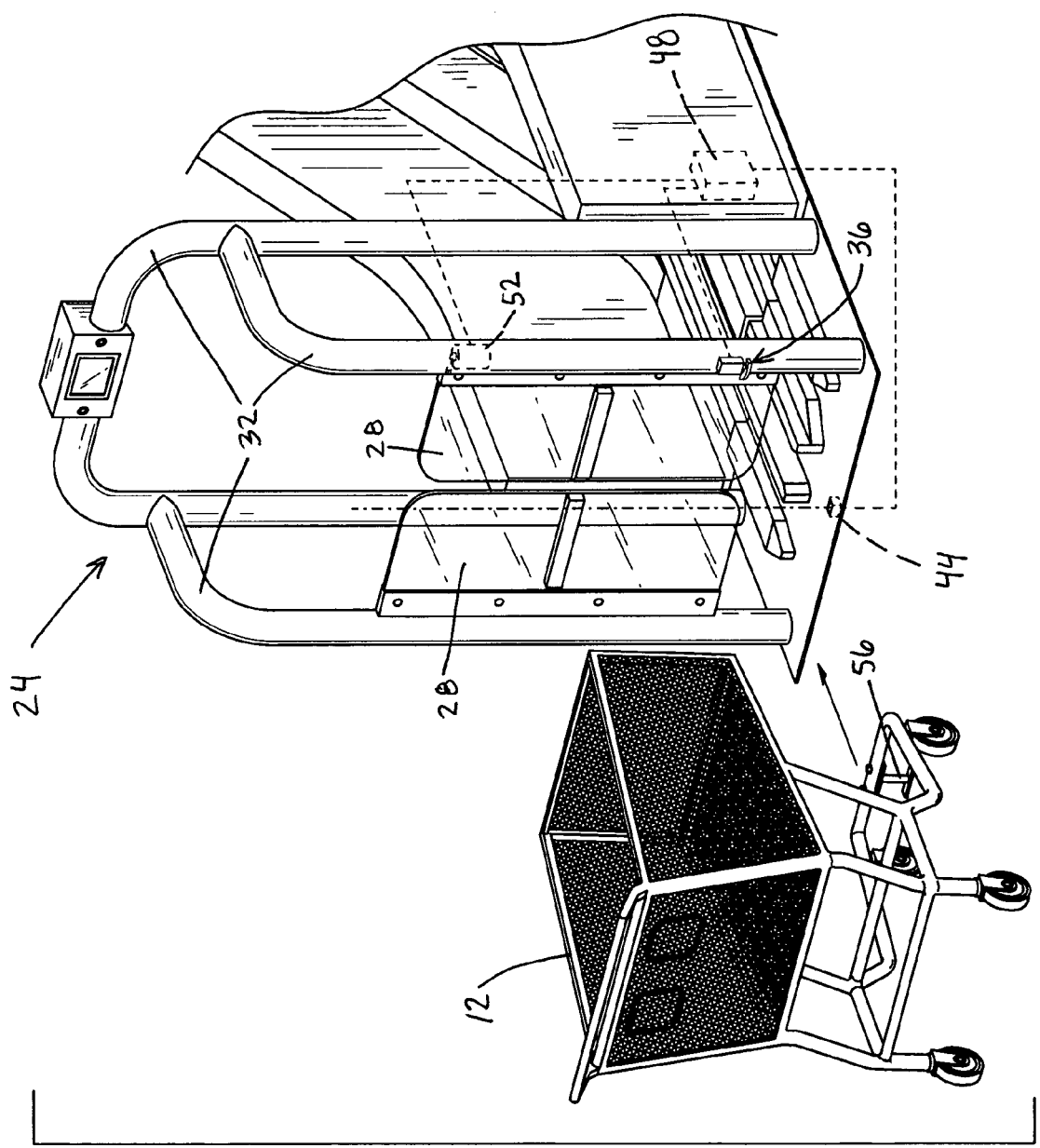
FIG. 2 is an enlarged perspective view of a gate assembly of a shopping cart conveyor system that is a first embodiment of the present invention.

The gate assembly 24 illustrated in FIG. 2 is entry gate and includes a door 28 that is movable between an open position, allowing access to the track, and a closed position, inhibiting access to the track. In the illustrated embodiment, the gate assembly 24 includes two doors 28. The operation of one of the doors 28 will be described herein. The door 28 is mounted for pivotal movement relative to the frame 32. The pivotal movement of the door 28 is only given as a single example. The door 28 can include virtually any type of configuration that provides an open position and a closed position. Single or multiple doors 28 may be used with the invention, and in some embodiments the gate assembly 24 includes a completely different configuration for selectively preventing entry of shopping carts, other objects or beings to the tracks 14, 18 of the conveyor 10.

In the illustrated embodiment, the door 28 is provided with a lock 36. The lock 36 allows the door 28 to be configurable in either a locked state or an unlocked state. The lock 36 may consist of virtually any type of device capable of holding the door 28 in a fixed position. The lock 36 in FIG. 2 is a simple solenoid fixed to the frame 32. The solenoid includes a movable member for selectively engaging and locking the door 28.

With continued reference to FIG. 2, the gate assembly 24 is provided with a sensor 44 that is positioned to detect the shopping cart 12. The sensor 44 communicates via a signal, such as an electrical signal or wireless signal, with a controller 48. The controller 48 in turn communicates with the lock 36. Upon detection of the presence of a shopping cart, the sensor 44 sends a signal to the controller, and the controller 48 sends an "unlock" signal to the lock 36, which triggers the lock 36 to switch from the locked state to the unlocked state. In some embodiments, the lock 36 is biased or otherwise held in the locked state. In other embodiments, a "lock" signal is sent from the controller 48 to the lock 36 for re-locking.

The gate assembly 24 is further provided with a drive mechanism 52 for moving the door 28 between the closed and open positions. In the illustrated embodiment, the drive mechanism 52 is a motor located within the frame 32. The drive mechanism 52 is configured to receive an "open" signal sent from the controller 48. The "open" signal can be independent or dependent upon the signal sent to the lock 36. For example, in some embodiments, the signal sent by the controller for unlocking the lock 36 begins a delay timer function within the controller, which delays the "open" signal. Upon receiving the "open" signal from the controller 48, the drive mechanism 52 is energized to move the door 28 from the closed position to the open position, allowing entry to the conveyor 10. In other embodiments, the lock and motor can be incorporated into a single device, such as a motor with a friction clutch or a motor coupled to a locking gear train.

Once opened, the door 28 is held in the open position (e.g., by the lock 36, the drive mechanism 52, or another holding means) for a fixed amount of time in some embodiments. The controller 48 is programmable to set or change the amount of time that the door 28 is held in the open position after receiving the signal from the sensor 44 indicating the presence of the shopping cart 12. Alternatively, the closing of the door 28 transpires upon a separate "close" signal from the controller 48. The "close" signal may be generated by an auxiliary sensor indicating the passing of the shopping cart 12 through the door 28, but may also be generated by the sensor 44, a timer function in the controller 48, or any combination thereof.

The sensor 44 of FIG. 2 is arranged in a generally vertical direction for sensing in a generally upward direction. The sensor 44 of FIG. 2 is positioned near the bottom of the gate assembly 24 just outside the door 28. In some embodiments, the sensor 44 is protected from physical contact or interference by positioning it partially or wholly in the floor or bottom surface of the gate assembly 24. The sensor 44 and controller 48 are configured to detect or sense the shopping cart 12. In some embodiments, each authorized shopping cart 12 to be used with the conveyor 10 is provided with an identifier, which identifies to the sensor 44 that it is an authorized shopping cart. This helps prevent entry of any cargo to the tracks 14, 18 other than the shopping cart 12. In some embodiments, the shopping cart 12 includes an engagement bracket 56 as disclosed in U.S. Pat. No. 6,490,979. The engagement bracket 56 is used to provide a point of engagement to the tracks 14, 18, but may also be employed as the identifier.

The sensor 44 may be selected from many various types, depending on the identifier. For example, the sensor 44 may be ultrasonic, optical, infrared, mechanical, radar, magnetic or Hall effect, etc. In some embodiments, the sensor 44 is configured as a radio frequency identification (RFID) reader for identifying RFID tags or labels (identifiers) that may be placed on the shopping carts 12.

Figure 3:
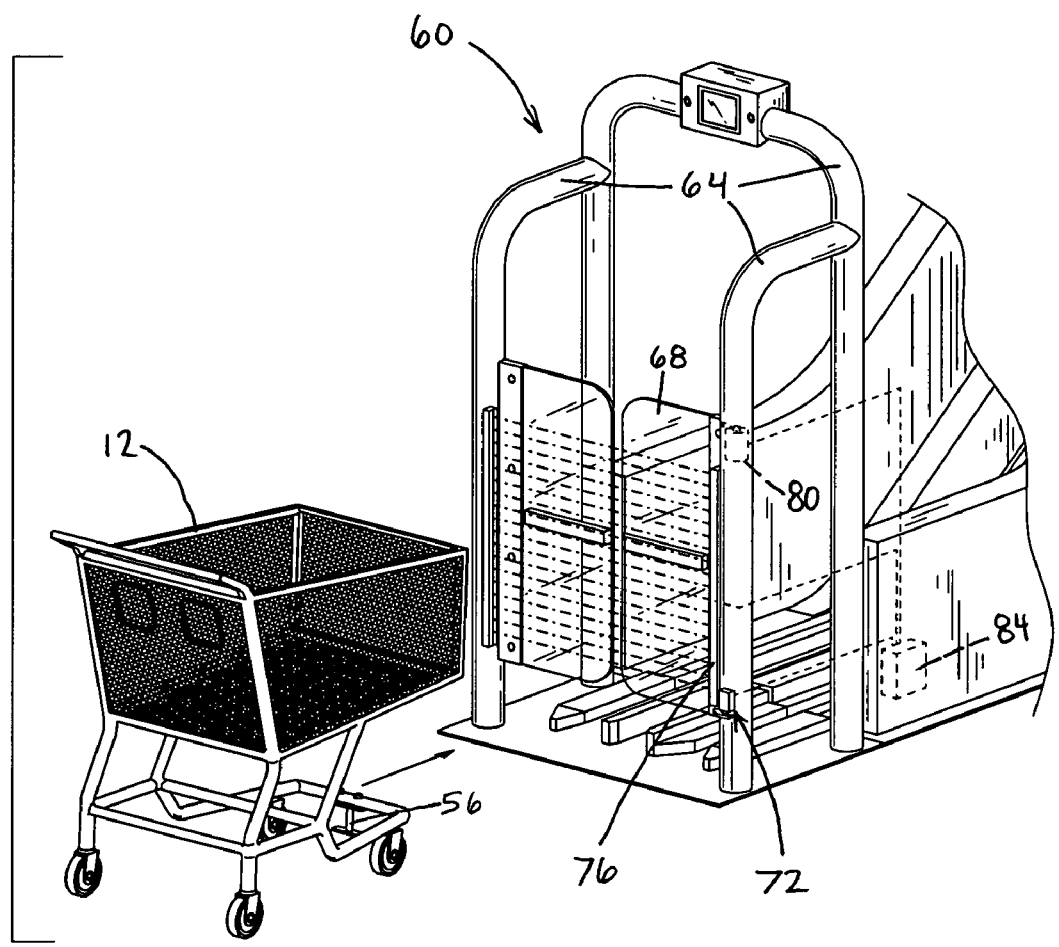
FIG. 3 is a perspective view of a gate assembly that is a second embodiment of the present invention.

FIG. 3 illustrates a different gate assembly 60 for use with the conveyor 10. The gate assembly 60 includes a frame 64 and a door 68, similar to the previous embodiment. A lock 72 permits the door 68 to be configured in either a locked or an unlocked state. In the illustrated embodiment, a sensor 76 is configured to detect the presence of the shopping cart 12 proximate the conveyor 10.

The sensor 76 of FIG. 3 is positioned near the lateral sides of the gate assembly 60. The sensor 76 is shown with an exemplary shape, which is tall and narrow. As described above with reference to the previous embodiment, the sensor 76 may employ any one of a number of sensory technologies to detect the presence of the shopping cart 12. In some embodiments, multiple sensory methods are used in combination.

As with the previous embodiment, a drive mechanism 80 is operable to open the door 68 from the closed position to the open position. A controller 84 receives a signal from the sensor 76 when the shopping cart 12 is detected near the conveyor 10. In some embodiments, the sensor 76 also sends a signal to the controller 84 when the shopping cart 12 is not detected (indicating absence of the shopping cart 12). Upon detection and identification of the presence of the shopping cart 12 by the sensor 76 and the controller 84, the controller 84 sends a signal to either the lock 72, the drive mechanism 80 or both.

Figure 4:
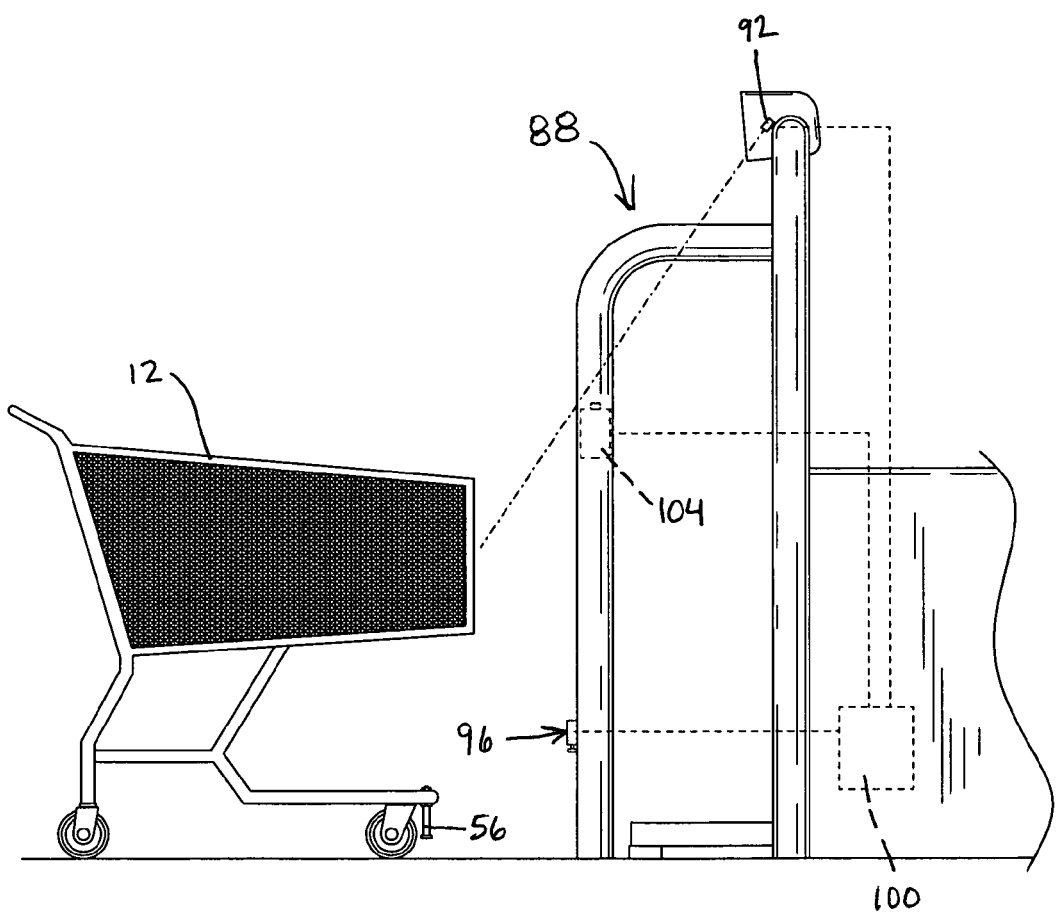
FIG. 4 is a perspective view of a gate assembly that is a third embodiment of the present invention.

FIG. 4 illustrates a gate assembly 88 including a sensor 92. The sensor 92 may vary in type and field of view as described above. The sensor 92 is positioned atop the gate assembly 88 and is configured to sense whether or not the shopping cart 12 is present. A lock 96, a controller 100, and a drive mechanism 104 are provided for operation as described above with reference to the previous embodiments.

In another embodiment that is not illustrated, the sensor can be positioned at least partially in the center track (FIG. 1) that is adapted to receive the engagement bracket 56. In this embodiment, it is less likely that the sensor will be activated by something other than an authorized shopping cart (i.e., one having an engagement bracket). In this embodiment, the center track would need to be extended outward from the conveyor so that the engagement bracket can be inserted into the center track and sensed by the sensor before the shopping cart engages the doors.

In addition, although the above-described and illustrated embodiments disclose use of an electronic sensor, it should be understood that the sensor could be mechanical. For example the sensor could be a lever that is moved by engagement with a shopping cart (e.g., the engagement bracket 56), and the lever could be coupled to a locking device to unlock the gate.

Thus, the invention provides, among other things, a system and method for controlling access to a conveyor for shopping carts. Various features and advantages of the invention are set forth in the following claims.

What is claimed is:

1. A conveyor for moving a shopping cart having an identifier between a first location and a second location, the conveyor comprising:
   a track operable to guide the shopping cart between the first location and the second location;
   a gate assembly including a door movable between a closed position inhibiting entry to the track and an open position allowing entry to the track;
   a lock for securing the door in the closed position; and
   a sensor positioned to detect the identifier.

2. The conveyor of claim 1, wherein the identifier comprises an engagement bracket for engagement with the track.

3. The conveyor of claim 1, wherein the sensor is one of an ultrasonic sensor, an optical sensor, a radar sensor, an infrared sensor, an RFID reader, a magnetic sensor, and a mechanical sensor.

4. The conveyor of claim 1, configured such that the lock will move to an unlocked state when the sensor detects the presence of the identifier.

5. The conveyor of claim 1, further comprising a controller coupled to the sensor and to the lock, wherein the controller is configured to unlock the lock when the sensor detects the presence of the identifier.

6. The conveyor of claim 1, further comprising a drive mechanism operable to open the door when the sensor detects the presence of the identifier.

7. A conveyor for towing a shopping cart between a first location and a second location, the conveyor comprising:
   a track operable to engage a point of engagement of the shopping cart and move the shopping cart in the desired direction between the first location and the second location;
   a door movable between an open position to allow entry to the track and a closed position to inhibit entry to the track, wherein the door is lockable in the closed position;
   a sensor positioned to detect the point of engagement and operable to output a first signal upon detecting the point of engagement; and
   a controller configured to receive the first signal from the sensor to unlock the door.

8. The conveyor of claim 7, further comprising a drive mechanism operable to move the door from the closed position to the open position.

9. The conveyor of claim 8, wherein the controller is configured to interpret the first signal to determine if the point of engagement is proximate the conveyor and consequently output a second signal to activate the drive mechanism.

10. The conveyor of claim 7, wherein the sensor is one of an ultrasonic sensor, an optical sensor, a radar sensor, an infrared sensor, an RFID reader, a magnetic sensor, and a mechanical sensor.

11. A method of selectively allowing entry to a conveyor for shopping carts comprising:
    sensing the absence or presence of a point of engagement of a shopping cart proximate the conveyor;
    preventing access to the conveyor when the absence of the point of engagement is sensed; and
    allowing access to the conveyor when the presence of the point of engagement is sensed.

12. The method of claim 11, wherein the conveyor includes a door configurable in either a locked state or an unlocked state, and wherein preventing access to the conveyor includes maintaining the door in the locked state.

13. The method of claim 11, wherein the conveyor includes a door configurable in either a locked state or an unlocked state, wherein allowing access to the conveyor includes unlocking the door.

14. The method of claim 11, wherein the conveyor includes a door movable between an open position and a closed position, wherein allowing access to the conveyor includes moving the door from the closed position.

* * * * *